United States Patent
Daniel et al.

(10) Patent No.: US 8,660,521 B1
(45) Date of Patent: Feb. 25, 2014

(54) SYSTEMS AND METHODS FOR PROVIDING RENEWABLE WIRELINE AND WIRELESS SERVICES AND GOODS

(75) Inventors: John Scott Daniel, Lawrenceville, GA (US); Tina Michelle Guess, Atlanta, GA (US); Tom McGinty, Alpharetta, GA (US); Melody Ezell Eclavea, Alpharetta, GA (US); Christopher John Pidgeon, Cumming, GA (US); Lauren Lucille Champion, Marietta, GA (US); Yvette Sass Salley, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1468 days.

(21) Appl. No.: 11/764,818

(22) Filed: Jun. 19, 2007

Related U.S. Application Data

(60) Provisional application No. 60/915,586, filed on May 2, 2007.

(51) Int. Cl.
*H04M 11/00* (2006.01)
*H04M 15/00* (2006.01)

(52) U.S. Cl.
USPC ........... 455/405; 455/406; 455/407; 455/408; 379/114.15; 379/114.16; 379/114.17; 379/114.2

(58) Field of Classification Search
USPC ..................................... 455/405–408, 414.3; 379/114.12–114.27; 705/26
See application file for complete search history.

(56) References Cited

U.S. PATENT DOCUMENTS

| | | | |
|---|---|---|---|
| 7,139,372 B2* | 11/2006 | Chakravorty et al. | ... 379/114.01 |
| 7,340,258 B2* | 3/2008 | Benco et al. | 455/452.2 |
| 2002/0123336 A1* | 9/2002 | Kamada | 455/420 |
| 2004/0137890 A1* | 7/2004 | Kalke | 455/418 |
| 2005/0251459 A1* | 11/2005 | Kim et al. | 705/26 |
| 2007/0162395 A1* | 7/2007 | Ben-Yaacov et al. | 705/51 |
| 2007/0187492 A1* | 8/2007 | Graves et al. | 235/380 |
| 2007/0224969 A1* | 9/2007 | Rao | 455/411 |
| 2008/0087722 A1* | 4/2008 | Collins | 235/380 |
| 2010/0104078 A1* | 4/2010 | Henry et al. | 379/114.17 |
| 2010/0297982 A1* | 11/2010 | Espejo et al. | 455/406 |

\* cited by examiner

*Primary Examiner* — Wesley Kim
(74) *Attorney, Agent, or Firm* — Parks IP Law LLC; Jennifer P. Medlin, Esq.

(57) ABSTRACT

Methods for provisioning wireline or wireless services and goods to at least one prepaid or postpaid customer in a communications network are provided. In one such method, a request is received for at least one service or good from a prepaid customer and it is determined based upon the request if sufficient funds are available to pay for the requested service and, if not, a warning message is sent to the customer. If funds are available a payment for the requested service or good is deducted form the customer's account, the account balance is updated, and an authorization is sent to the service node for that facilitates the requested service or good. Upon receipt of the authorization, the service node is permitted to access the requested service or good in accordance with a parameter. Other similar methods are provided for postpaid customers.

42 Claims, 12 Drawing Sheets

SYSTEMS AND METHODS FOR PROVIDING RENEWABLE WIRELINE AND WIRELESS SERVICES AND GOODS

CROSS-REFERENCE TO RELATED APPLICATIONS

This application claims priority to U.S. Provisional Application No. 60/915,586, filed May 2, 2007, the entirety of which is incorporated herein by reference.

TECHNICAL FIELD

The present invention relates generally to the provisioning of services to customers and, more particularly, to real-time provisioning of services for prepaid and postpaid customers of wireline and wireless services.

BACKGROUND OF THE INVENTION

Telecommunications services such as cellular communications are generally provided to customers via two methods, prepaid and postpaid. Prepaid customers typically purchase a number of voice minutes at a predetermined cost prior to receiving wireless voice service. After the predetermined number of voice minutes is exhausted the prepaid customer must replenish their account prior to receiving future service. Prepaid wireless service is popular among customers who are ineligible for a contract-based subscription service, such as customers with no or poor credit history, and young adults, among others.

Postpaid accounts are designed such that if the customer exceeds the number of voice minutes, data capacity, text messages, or other services available for their account, the postpaid customer will be charged for the excess services on a bill sent to the customer at the end of the billing cycle. Often times, the customer is unaware of the overage and is requested to pay an unexpected bill at the end of the billing cycle.

Services, such as Cingular's ROLLOVER® service aim to eliminate overages and accumulate unused minutes for use in future billing cycles. This service, however, does not allow for a user to add voice minutes on-the-fly and requires the subscriber to be using the service for at least one month to accumulate unused minutes.

Postpaid customers are set to a monthly reoccurring charge (MRC) that does not typically fluctuate from month to month. Accordingly, it is difficult for service providers to increase revenue from these customers outside of the occasional overage or purchase (e.g., ringtone).

Prepaid customers are often limited to pay-per-use voice and data for their prepaid service. Many prepaid customers are teenagers and young adults that are socially-active. Data services such as text messaging are widely popular among this demographic, however, a postpaid subscription service is not ideal or not obtainable for many of these customers. Other customers enjoy the ability to pay on an as-needed basis as opposed to being confined to a postpaid subscription service.

Thus, it would be beneficial for a postpaid customer to offer services to increase the allotment of a certain service (e.g., minutes/month) for a particular billing period on an as-needed basis. Also, the ability to offer free or pay trials for services could aid in introducing new features and services to customers. These on-the-fly services can increase revenue for the service provider from postpaid customers. Likewise, the ability to offer enhanced services to prepaid customers is also desirable to service providers.

Accordingly, what is needed is novel methods to provision wireline and wireless services and goods in real-time or near real-time for postpaid and prepaid subscribers, such as to provide additional services for prepaid customers and provide trial and on-the-fly availability of services for postpaid customers.

SUMMARY

The various embodiments of the present invention overcome the shortcomings of the prior art by providing methods for adhoc provisioning of a temporary subscription for wireless and wireline goods and services to at least one prepaid or postpaid customer in a communications network. In one such method, a request is received for at least one service or good from a prepaid customer and it is determined based upon the request if sufficient funds are available to pay for the requested service and, if not, a warning message is sent to the customer. If funds are available a payment for the requested service or good is deducted from the customer's account, the account balance is updated, and an authorization is sent to the service node that facilitates the requested service or good. Upon receipt of the authorization, the service node is permitted to access the requested service or good in accordance with a specification.

In another method, a request is received for at least one service or good from a postpaid customer and it is determined if the service or good is to be billed. If the service or good is requested to be billed, a billing authorization is performed. If it is determined that the postpaid customer is authorized for billing, an authorization is sent to the service node for the requested service or good. The authorization is used for authenticating the use of the service node. Upon receipt of the authorization, the service node is permitted to access the requested service or good in accordance with a specification.

However, if the postpaid customer is not authorized for billing a first warning message is sent to the postpaid customer. The first warning message can request payment from an account such as a checking account, savings account, debit account, credit account, or points account. It is then determined if funds are available in the account to pay for the requested service or good. If appropriate funds are not available, a second warning message can be sent to the customer. If appropriate funds are available, a payment for the requested service or good can be deducted from the account and the balance accordingly updated. After which, an authorization is sent to the service node for the requested service or good. The authorization is used for authenticating the use of the service node. Upon receipt of the authorization, the service node is permitted to access the requested service or good.

Another method is provided for managing a database wherein the database is configured to store at least one service or good provisioned for use by at least one prepaid or postpaid customer in a communications network. In this method, at least one service or good is provisioned for use by a customer and a database entry is established in the database. The database entry is associated with a customer account and corresponds to the service or good. The database entry can include a specification corresponding to at least one of the following: a time period during which the service or good is available and a quantity of the service or good. A countdown timer and a usage monitor are provided and configured to track the remaining time the service or good is available to the customer, and the remaining quantity of the service or good, respectively. The method also provides for storing in the database the initial time and the initial quantity of the provisioned service or good and updating at least one of the countdown timer and the usage monitor in response to a change in the remaining time and remaining quantity, and updating the database appropriately. It is then determined if at least one of the time period and the quantity has expired. If at least one of the time period and the quantity has not expired, the database is updated to include at least one of the remaining time and the remaining quantity.

The above methods may be stored on a computer-readable medium as computer-executable instructions.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
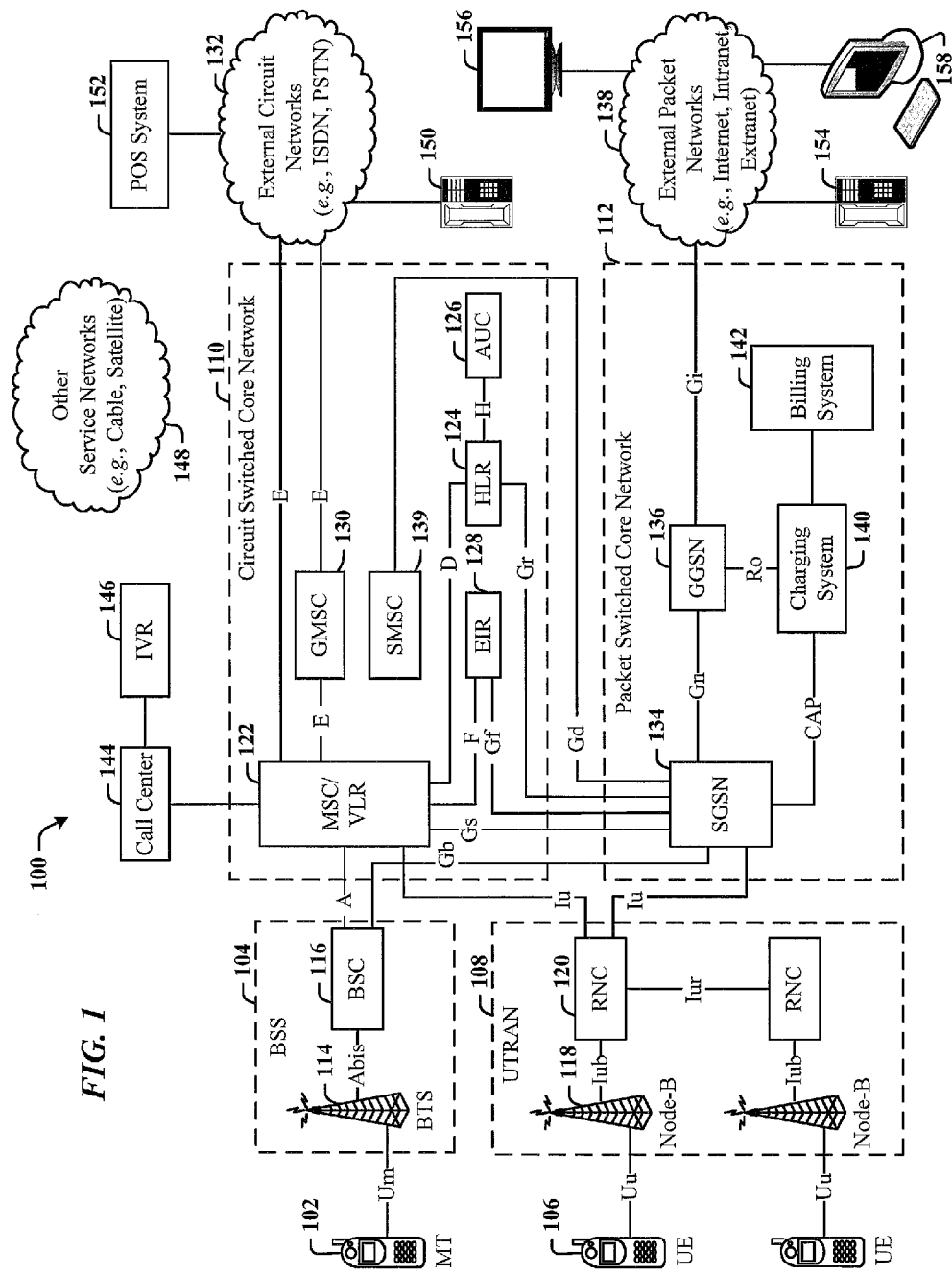
FIG. 1 illustrates an exemplary communications network in accordance with an embodiment of the present invention.

Referring now to the drawings in which like numerals represent like elements throughout the several views, FIG. 1 illustrates an exemplary communications network 100 in accordance with an embodiment of the present invention. The communications network 100 is designed to facilitate wireless and wireline services (and/or goods) for both prepaid and postpaid customers. As used herein, a prepaid service/good is defined as a service/good paid in full in advance to a customer using the service/good. There are various procurement options available to the prepaid customer, such as prepaid cards which may be purchased at a store and may be renewable such that the customer can replenish the card value (in the case of monetary value) with additional funds.

In one embodiment of the present invention, a prepaid card is provided as a monetary valued card. A monetary valued card can include a predetermined value in a currency that may be used to purchase any service or good offered by a wireless or wireline service provider. Alternatively, a card may be limited to certain services and/or goods. In another embodiment, a prepaid card is provided as a service valued card. A service valued card can include a predetermined service value, such as a number of voice minutes, a number of data minutes, a data transfer capacity (e.g., X bytes/Kbytes/Mbytes), a number of text messages, a number of multimedia messages, mobile television service, mobile radio service, device insurance, and like services. A service valued card can also include unlimited use of one or more of these services for a specified period of time and be set to expire after the time period. For example, the service value may be designed such that 120 data minutes are available to the customer for a period of no longer than 30 days. In yet another embodiment, a prepaid card is provided as a good valued card. A good valued card can include a predetermined good value, such as a number of ringtones, songs, audio books, videos, movies, and like goods. A good can include any digital media, such as text, audio, video, video games, holographs, community chat, and the like.

A prepaid card can be configured as is known in the art. A customer can purchase the prepaid card and be required to activate the card. By way of example, the customer may be required to place a call to a customer call center or an automated system (e.g., Interactive Voice Response (IVR)) and provide an identification number on the card to activate the purchased services or goods. Further, the customer may be required to activate the card using the mobile device associated with the customer's prepaid account for authentication purposes. In some instances, the customer may not already have an established prepaid account. A prepaid account establishment process may occur upon the customer's first use of the prepaid service, such as those known in the art.

Other procurement options for prepaid services include an Internet website, a call center, or an Interactive Voice Response (IVR) system to purchase, manage, and activate prepaid services and goods. It is contemplated that a database designed specifically for prepaid customers can be designed to manage and monitor the present status of purchased services and goods for each prepaid customer. For example, customer A purchases a prepaid card for a 120 minute data session that is scheduled to expire in 30 days. By further example, customer A also purchases a prepaid card for 5 ringtones that is scheduled to expire in 14 days. The database could compile and store an entry to include the start time and end time of the data session service and ringtone good for customer A as well as an indication of the remaining data minutes and ringtones available for customer A as the minutes and ringtones are used. The data minutes and ringtone quantity is updated in real-time or near real-time to reflect the remaining minutes and ringtones for customer A. The database is later described in detail.

In addition to prepaid services and goods for wireless services, the present invention is also applicable to other services such as wireline telephone service, wireline Internet service, Voice over Internet Protocol (VoIP) service, cable television service, satellite television service, satellite radio service, and any other wireline or wireless service(s). Payment for these services can be handled via appropriate billing systems associated with the wireline service providers and in some instances a converged billing system that incorporates a plurality of service billing systems that may be used to perform billing processes, such as those for both wireless and wireline services.

The present invention is also applicable to postpaid customers. As used herein, a postpaid service or good is defined as a service or good paid in full after a customer uses the service or good. This is typically done on a predetermined billing cycle. The present invention provides real-time provisioning of services or goods for a one-time charge instead of the monthly reoccurring charge (MRC) typically associated with postpaid accounts. By way of example, a postpaid customer may only have 500 minutes each month and in a particular month the customer may have used 450 of their minutes within the first two weeks of the month. In accordance with the present invention, the customer can purchase an additional X minutes to avoid paying overages at the end of the month. The minutes would be available to the customer after a one-time charge or billed to the customer's postpaid account. It is contemplated that the additional minutes can be offered for a one-time charge consistent with the service rate (e.g., $/minute) currently established for the customer's plan.

The present invention is also extensible to adding temporary services or goods to a customer's plan in real-time or near real-time. A temporary service may be offered at a proportioned rate for a subscription plan, as a free or pay trial, or at a discounted rate. For example, suppose customer B currently only has voice minutes and text messages available in their subscription plan, however, recently the customer has become interested in purchasing a data plan and would like to try a data plan prior to committing to a MRC for the service. Accordingly, the present invention can allow customer B to select a trial period of a limited or unlimited amount of data minutes for a specified trial period, for example, 30 days. Further, after the trial, customer B may elect to purchase the data plan on an as needed basis. For example, customer B can purchase a data plan for a one-time charge billed in real-time or charged to the customer's account for future billing.

The aforementioned has broadly outlined several inventive aspects of the present invention. The communications network 100 is now described in detail as it relates to those aspects.

The architecture of the illustrated network 100 incorporates elements of a Global System for Mobile communications (GSM) network, a Generic Packet Radio Service (GPRS) network, and a Universal Mobile Telecommunications System (UMTS) network in the wireless domain. It should be understood, however, that the present invention is network agnostic and may be implemented using Code Division Multiple Access (CDMA), CDMA2000 or other wireless technology. More particularly, the illustrated communications network 100 includes a mobile terminal (MT) 102 in communication with a base station subsystem (BSS) 104 on the GSM side of the network. On the UMTS side, a user equipment (UE) 106 is in communication with a UMTS terrestrial radio access network (UTRAN) 108. The BSS 104 and UTRAN 108 are in communication with a circuit switched core network (CS-CN) 110 and a packet switched core network (PS-CN) 112. The aforementioned radio access networks (i.e., BSS 104 and UTRAN 108) and the core networks 110, 112 comprise the basic subsystems of the illustrated communications network 100.

Referring now to the GSM network side, the BSS 104 can include one or more base transceiver stations (BTS) 114 and a base station controller (BSC) 116 which are connected via an A-bis interface. The mobile terminal 102 is in communication with the BTS 114 via a Um air interface. Base stations are all interconnected to facilitate roaming from one cell to another via a process called handover, without losing the cell connection. The BSC 116 provides the intelligence behind the BTS 114. Typically, a BSC can have tens or even hundreds of BTSs 114 under its control. The BSC 116 handles allocation of radio channels, receives measurements from the mobile terminals, and controls handovers from BTS to BTS (except in the case of an inter-MSC (mobile switching center) handover in which case control is in part the responsibility of the MSC). One function of the BSC 116 is to act as a concentrator such that many different low capacity connections to the BTS 114 can become reduced to a smaller number of connections towards the MSC. Generally, this means that networks are often structured to have many BSCs 116 distributed into regions near the BTS 114 which are then connected to large centralized MSC sites.

A node-B 118 is the UMTS counterpart to the GSM BTS 114. The node-B 118 is in communication with a Radio Network Controller (RNC) 120 which functions similar to the BSC 116 in the GSM domain. Multiple RNCs can be connected together via an Iur interface, and the RNCs can in turn be connected to one or more node-Bs 118 via an Iub interface. A UE 106 communicates with the node-B 118 via a Uu air interface. The RNC 120 communicates with the MSC/VLR 122 via an Iu interface and to the SGSN 134 via the same interface. It should be understood that elements of the communications network 100 have been simplified and in fact different architecture may be used to facilitate both 2G and 3G wireless services.

The BSC 116 is in communication with the CS-CN 110 and particularly the MSC/VLR 122 (mobile switching center/visiting location register) via an A interface. The MSC/VLR 122 is in communication with a home location register 124 via a D interface. An authentication center (AuC) 126 is in communication with the HLR 124 via an H interface. The MSC/VLR 122 is also in communication with an equipment identity register (EIR) 128 via an F interface. The AuC 126 and the EIR 128, although technically separate functions from the HLR 124, may be combined into a single network node.

The MSC/VLR 122 is in communication with a gateway MSC (GMSC) 130 via an E interface. The GMSC 130 is also in communication with external circuit networks 132, such as an Integrated Services Digital Network (ISDN) and Public Switched Telephone Network (PSTN) for data transfer via the E interface. The MSC/VLR 122 is in communication with the external circuit networks 132 for voice transfer.

The MSC/VLR 122 is also in communication with the PS-CN 112 and more particularly to a Serving GPRS Support Node (SGSN) 134 via a Gs interface. The BSC 116 may include a packet control unit (not shown) for handling data transfer between the BSC 116 and the SGSN 134 via a Gb interface. Alternatively, an external PCU may be implemented. The HLR 124 and EIR 128 are in communication with the SGSN 134 via a Gr and Gf interface, respectively.

The SGSN 134 is in communication with a Gateway GPRS Support Node (GGSN) 136 via a Gn interface. The GGSN 136 provides access to external packet networks 138 such as the Internet, an intranet, or an extranet, for example. The GGSN 136 communicates with the external packet networks 138 via a Gi interface. The SGSN 134 can also be in communication with a Short Message Service Center (SMSC) 139 via a Gd interface. The SMSC 139 can provide SMS and in some implementations Multimedia Message Service (MMS) messages to a customer. Multiple SMSCs and/or a dedicated MMSC are also contemplated.

The SGSN 134 is in communication with a charging system 140 via a CAP interface. The GGSN 134 is in communication with the charging system 140 via an Ro interface. The charging system 140 is also in communication with a billing system 142.

Briefly, the charging system 140 is responsible for offline and online charging of customer accounts. The present invention can be implemented for use in prepaid and postpaid network platforms. For simplicity a single charging system is illustrated; however, separate charging systems are contemplated and may be utilized if desired by the service provider. As used herein, "offline charging" includes a charging mechanism where charging information does not affect, in real-time, the service rendered. Offline charging is applicable to most MRC applications, for example. Conversely, "online charging" includes a charging mechanism where charging information can affect, in real-time, the service. Online charging can be used in prepaid applications and real-time provisioning, for example. The charging system 140 and its components are described in further detail with reference to FIGS. 2-4.

The billing system 142 is responsible for billing postpaid customers and handling payments received for service provisioned in accordance with the present invention for both postpaid and prepaid accounts. Like the charging system 140, the billing system 142 can be designed as two separate entities for postpaid and prepaid applications. The billing system 142 is described in greater detail with reference to FIG. 5.

A call center 144 and an Interactive Voice Response (IVR) 146 are illustrated as being in communication with the MSC/VLR 122. The call center 144 and the IVR 146 can function to offer customer care services, such as account setup, account activation, account closure, account contact information updates, balance inquiries, prepaid deposits, bill-pay, and like services via a human operator and automated system, respectively. Although illustrated as being in direct communication with the MSC/VLR 122, the call center 144 and/or IVR 146 may in addition or alternatively be in communication with the external circuit networks 132.

The present invention is not limited to wireless telecommunication services and is extensible to wireline services, such as those provided by cable and satellite providers. Accordingly, other service networks 148 can include cable television and satellite television service providers, for example. Wireline telephone service providers can offer services such as dial-up or digital subscriber line (DSL) Internet access, wireline telephone 150 service, or VoIP telephone 154 service, for example. Real-time provisioning of other services such as cable and satellite television service for postpaid and prepaid customers are provided in accordance with one embodiment of the present invention. Although not illustrated, other service networks 148 may be in communication with the external circuit networks 132, external packet networks 138, the CS-CN 110, and/or the PS-CN 112.

A point-of-sale (POS) system 152 is also illustrated. The POS system 152 can be provided at a brick and mortar store or through an Internet website. The POS system 152 can allow a customer to purchase services directly or via service cards. It is contemplated that the POS system 152 can be used to offer wireline and/or wireless services. A direct purchase could involve the customer purchasing the service at the POS system 152 and the purchased service being updated in the customer's account for the corresponding service provider.

The account update can be accomplished by a connection between the POS system 152 and the service provider's billing system 142, for example. As mentioned previously, the service provider can be a wireless service provider or a wireline service provider. The services offered through features of the present invention can be any wireline or wireless service; however, some examples include, but are not limited to, traditional POTS (plain old telephone system) service, Voice over Internet Protocol (VoIP) service, cellular voice service, cellular data service, messaging service, Wi-Fi service, WiMax service, cable television service, IP television service, satellite television service, mobile television service, mobile radio service, satellite radio service, variations thereof, and the like. Other services such as device insurance are also contemplated.

The external packet networks 138 can provide Internet access for a computer 158, VoIP telephone access for a VoIP telephone 154, and IP television service for an IP television 156. Other packet-based services are also contemplated and are not limited to those shown nor are they limited to the Internet Protocol (IP).

Figure 2:
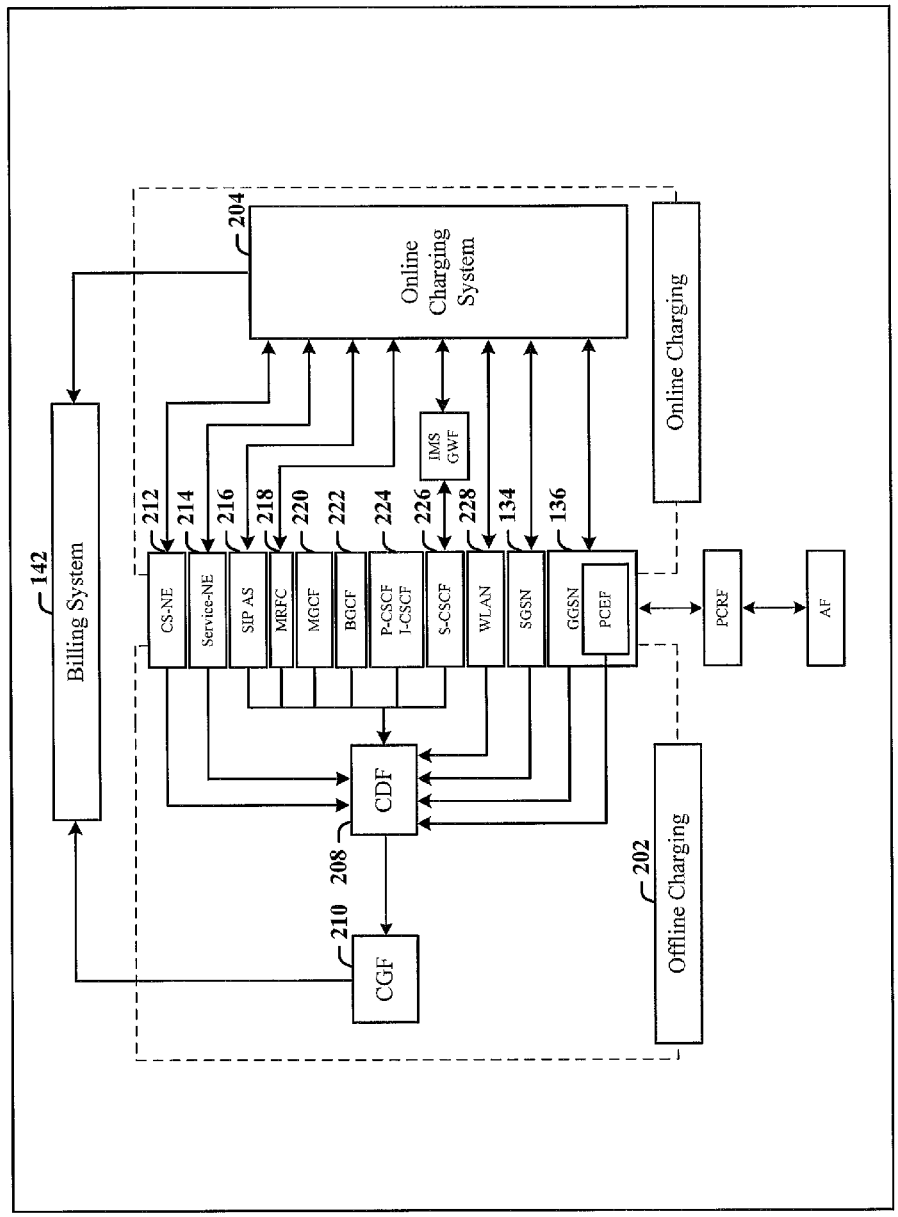
FIG. 2 illustrates an exemplary charging architecture to facilitate various features of the present invention.

Referring now to FIG. 2, an exemplary charging architecture 200 is illustrated as defined by the 3GPP technical specifications. The charging architecture 200 is illustrated as a single network entity but may be implemented as a plurality of entities such as for providing separate charging functions for both postpaid and prepaid customers. The left side of the charging architecture 200 illustrates an offline charging system 202. The offline charging system 202 includes a Charging Data Function (CDF) 208 and a Charging Gateway Function (CGF) 210. The right side of the charging architecture 200 illustrates an online charging system 204. The offline charging system 202 and the online charging system 204 are both operable to transmit call detail records (CDR) to a billing system 142. As previously described, "offline charging" includes a charging mechanism where charging information does not affect, in real-time, the service rendered. "Online charging" includes a charging mechanism where charging information can affect, in real-time, the service rendered. In the present invention, online charging is used for real-time provisioning of services for prepaid and postpaid customers for pre-pay applications and offline charging is used for real-time provisioning for postpaid customers in post-pay applications (i.e., future billing).

The offline charging system 202 communicates with the following elements or functions to receive charging information: a circuit-switched network element (CS-NE) 212 (such as those described in the CS-CN 110 of FIG. 1), a service network element (service-NE) 214, a Session Initiation Protocol (SIP) application service (SIP AS) 216, a Multimedia Resource Function Control (MRFC) 218, a Media Gateway Control Function (MGCF) 220, a Break-out Gateway Control Function (BGCF) 222, a Proxy-Call Session Control Function (P-CSCF)/Interrogate-CSCF (I-CSCF) 224, a Serving-CSCF (S-CSCF) 226, a wireless Local Area Network (WLAN) 228, an SGSN 134, and a GGSN 136. These and the other illustrated elements are described in detail in the 3GPP technical specifications.

Figure 3:
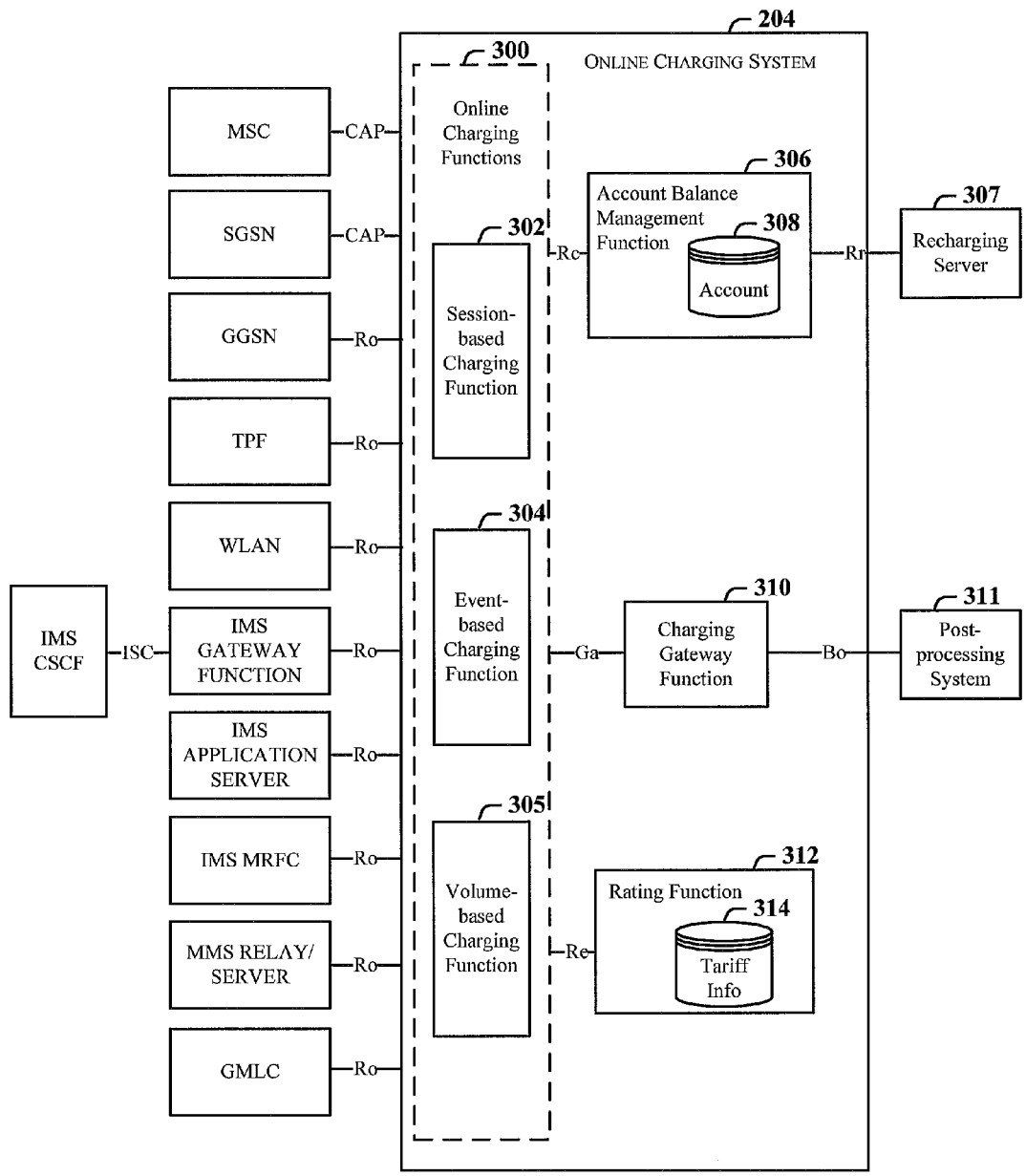
FIG. 3 illustrates an exemplary online charging system to facilitate various features of the present invention.

Referring now to FIG. 3, an online charging system 204 is illustrated. The illustrated online charging system 204 includes online charging functions 300. These can include a session-based charging function 302, an event-based charging function 304, and a volume-based charging function 305. Session-based charging (SBC) includes a service usage charging procedure that is based on the time period the user avails the service. Event-based charging (EBC) includes a service usage charging procedure that is based on per use of service. An example of event-based charging is a customer being charged per each SMS message sent or received from their handset. Volume-based charging (VBC) includes a service usage charging procedure that is based on the data volume transferred to the service user for the purpose of service execution. This may be measure in bytes, kilobytes (KB), or megabytes (MB), for example.

The online charging system 204 further includes an account balance management function (ABMF) 306 that is in communication with the online charging functions 300 via an Rc interface and is illustrated as storing one or more accounts 308. The accounts 308 can be prepaid or postpaid accounts and alternatively more than one ABMF 306 can be used such as one for postpaid customers and one for prepaid customers. The ABMF 306 is responsible for updating account balances based upon charges received from the online charging functions 300. For prepaid accounts, the ABMF 306 could debit a prepaid account for the services rendered. For postpaid accounts, the postpaid customer may establish a separate debit account that is associated with his/her postpaid account for temporary services, pay trials and the like. Alternatively, a credit card or other funds source may be used to pay for a service or good. The ABMF 306 is in communication with a recharging server 307 via an Rr interface. The recharging server 307 can allow a prepaid customer or a postpaid customer with a linked account to replenish their account. Account replenishment can include replenishment from a prepaid card, a bank account, a savings account, a points account, or other account for a prepaid customer. In certain instances, a credit card may be used, for example, if the prepaid customer has previously undergone a credit check or for postpaid customers with a linked account.

A charging gateway function 310 is in communication with the online charging functions 300 via a Ga interface and to a post-processing system 311 via a Bo interface. The post-processing system 311 can be a billing system. A rating function 312 is illustrated as being in communication with the online charging functions 300 via a Re interface. The rating function 312 includes tariff information 314. The tariff information 314 can include all the purchase values for the various goods and services provided by the service provider.

The online charging system 204 is in communication with a variety of network elements, some of which were previously described. Others, such as the IP Multimedia Subsystem (IMS) elements, have not been described and are generally known to those skilled in the art. Accordingly, features provided by an IMS network are also contemplated.

Figure 4:
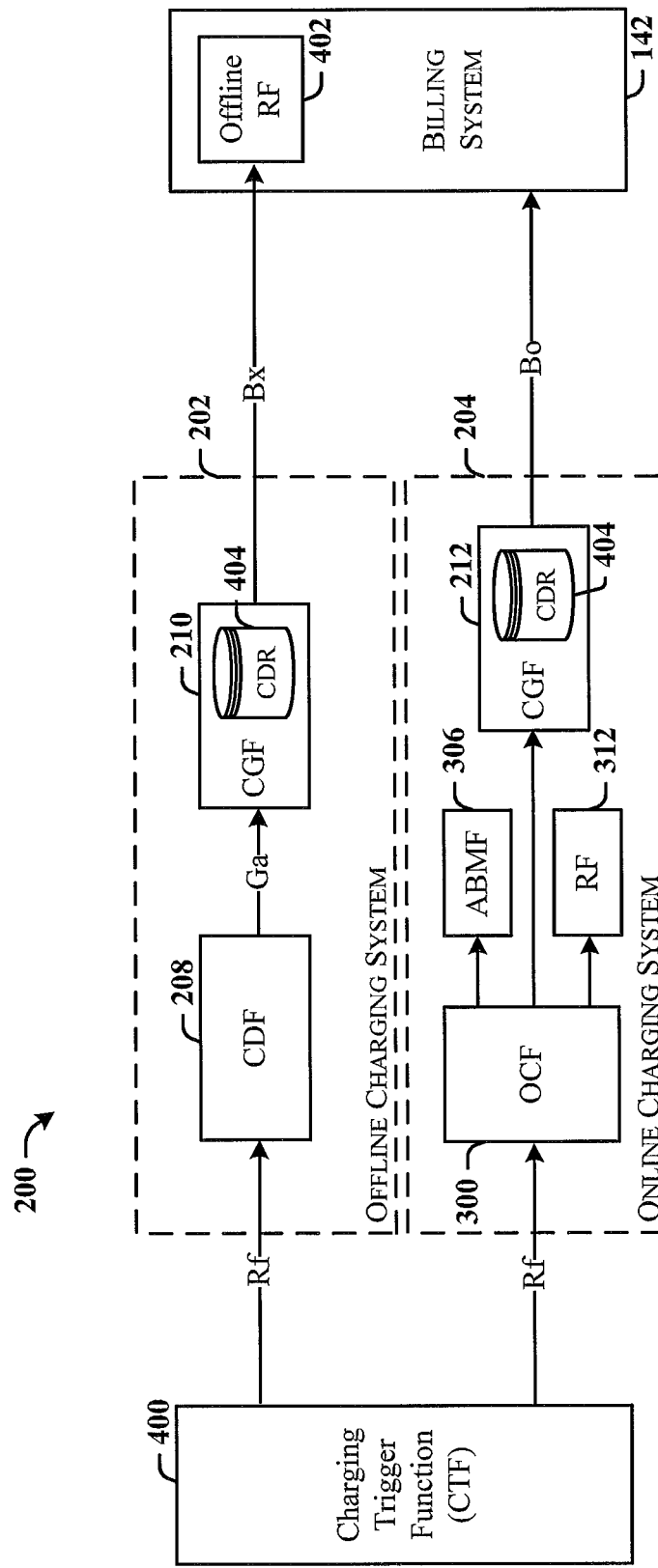
FIG. 4 illustrates an exemplary operation of the charging architecture illustrated in FIG. 2.

Referring now to FIG. 4, the charging architecture 200 is now described in detail. The illustrated charging architecture includes a charging trigger function (CTF) 400 that is in communication with the offline charging system 202 and the online charging system 204 via an Rf interface and an Ro interface, respectively. The CTF 400 can be implemented into any of the previously described service elements and can be configured to trigger a charging routine for a particular service or good. The offline charging system 202 includes a charging data function 208 that is in communication with a charging gateway function 210 via a Ga interface. The online charging system 204 includes an online charging function 300 that is in communication with an account balance management function (ABMF) 306, a rating function (RF) 312, and a charging gateway function 212. Each of the illustrated charging gateway functions 210, 212 are in communication with the billing system 142 via a Bx and Bo interfaces, respectively. The offline CGF 210 is in communication with an offline RF 402 that is illustrated as being stored within the billing system 142. The offline RF 402 is responsible for rating services for postpaid customers when the postpaid customer's bill reflects any charges the customer incurs during the billing period. Each of the CGFs 210, 212 includes call detail records (CDR) or more broadly termed charge detail records (CDR) 404 to reflect all charges not just voice call charges. Although the online and offline gateway functions 210, 212 and rating functions 312, 402 are described and illustrated as separate elements, a combined architecture is also contemplated.

Figure 5:
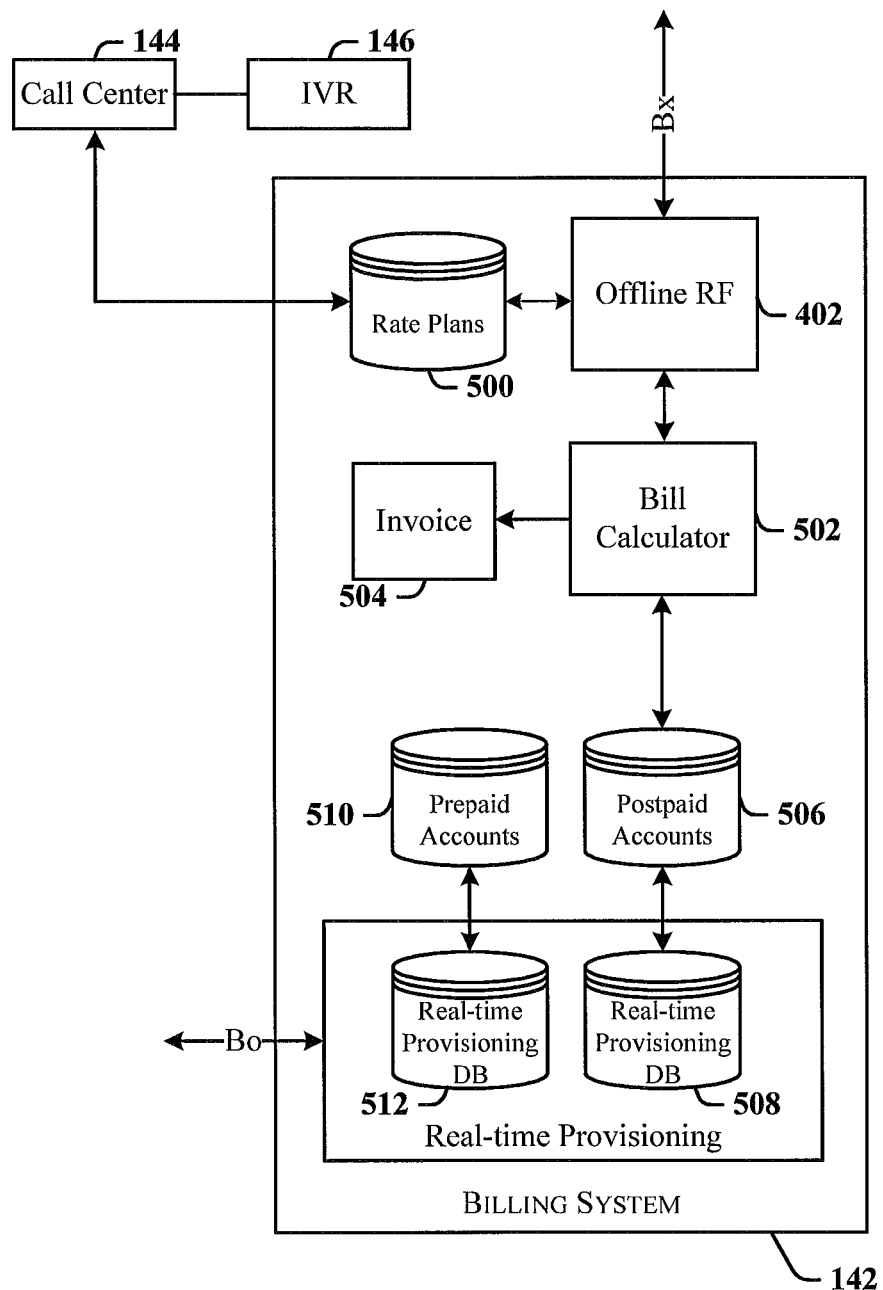
FIG. 5 illustrates an exemplary billing system in accordance with an embodiment of the present invention.

An exemplary billing system 142 is now described with reference to FIG. 5. The illustrated billing system 142 includes the offline rating function 402 that is in communication with the offline CGF 210 (see FIG. 4) via a Bx interface. The offline rating function 402 is in communication with a rate plans database 500 that is configured to store and manage rate plans for postpaid subscription services. The rate plans database 500 is in communication with a call center 144 that in turn is in communication with an IVR 146. The call center 144 and IVR 146 facilitate customer care services such as those described above with reference to FIG. 1. The offline rating function 402 is also in communication with a bill calculator 502 that is provided to calculate postpaid bills and process invoices 504 to be sent via email, mail or via another method to a postpaid subscriber at the end of a billing period.

The bill calculator 502 is in communication with a postpaid accounts database 506 that in turn is in communication with a postpaid provisioning database 508. The postpaid provisioning database is configured to store and manage services and/or goods provisioned in real-time or near real-time for postpaid subscribers. Although illustrated as part of the billing system 142, the postpaid provisioning database can be integrated into the online charging system 204 described in FIGS. 3 and 4. In one exemplary alternative embodiment, the provisioning databases 508, 512 can be in communication with the ABMF 306.

A prepaid accounts database 510 is also illustrated. The prepaid accounts database 510 is configured to maintain prepaid customer accounts and is illustrated as being in communication with a prepaid provisioning database 512 that functions similarly to the postpaid provisioning database, but for prepaid customers. The prepaid provisioning database 512 can be incorporated into the online charging system 204.

Figure 6:
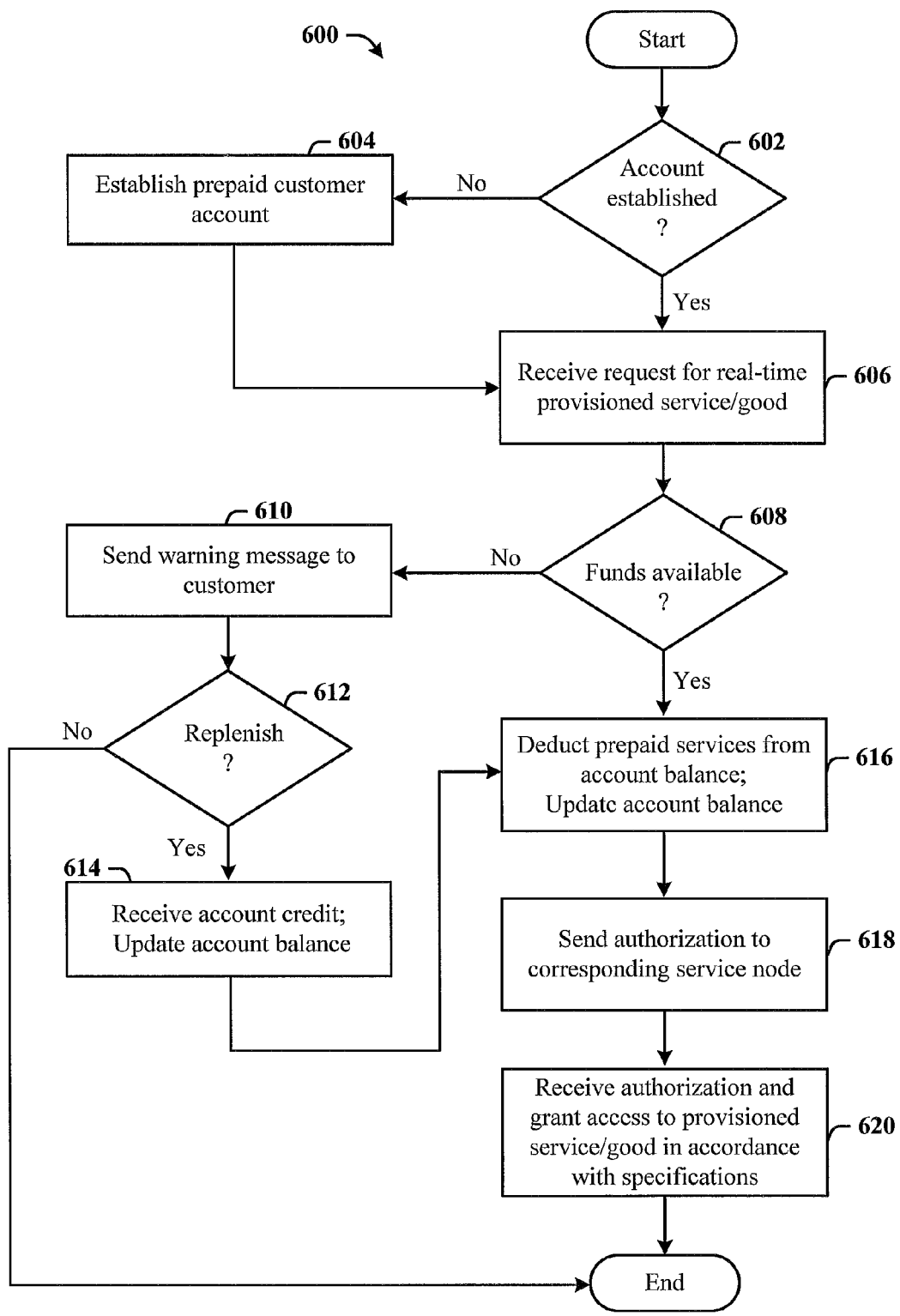
FIG. 6 illustrates a flow diagram of an exemplary method for adhoc provisioning of services and/or goods to a prepaid customer in accordance with the present invention.
Figure 7:
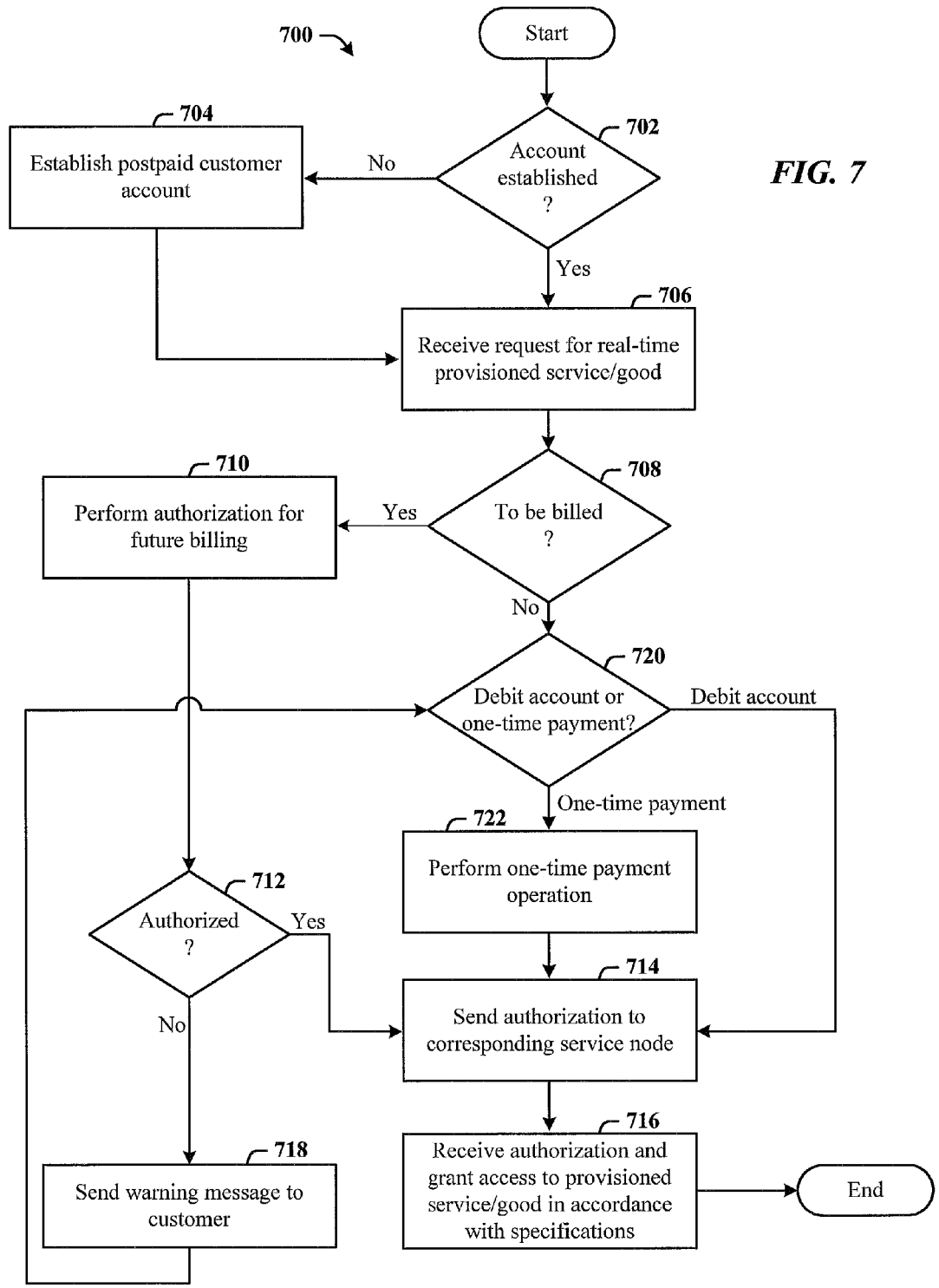
FIG. 7 illustrates a flow diagram of an exemplary method for adhoc provisioning of service and/or goods to a postpaid customer in accordance with the present invention.
Figure 8:
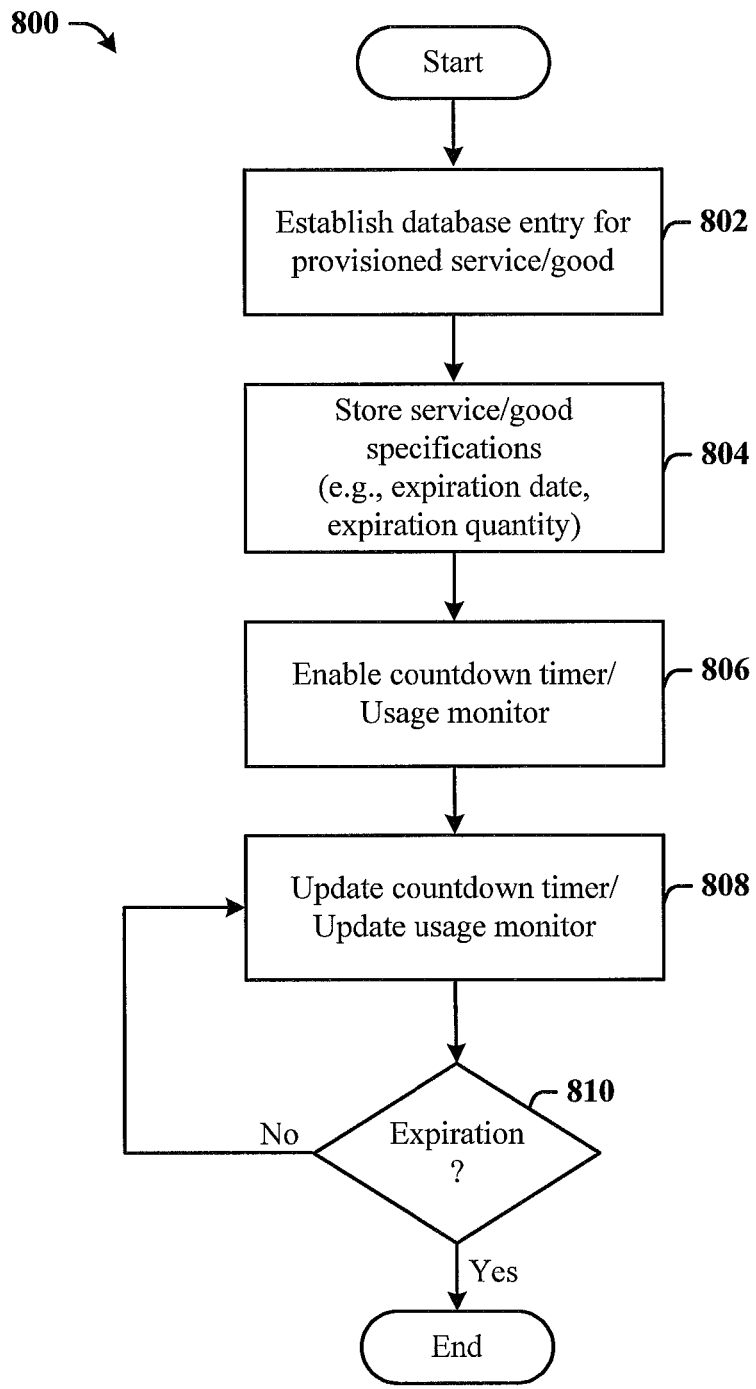
FIG. 8 illustrates a flow diagram of an exemplary method for managing a adhoc provisioning database in accordance with the present invention.

Referring now to FIG. 6, a flow diagram illustrating an exemplary method 600 for adhoc provisioning of services and/or goods to a prepaid customer in accordance with the present invention is illustrated. The methods illustrated in FIGS. 6-8 are not intended to be limited to the order shown.

The exemplary method 600 begins and flow proceeds to step 602 wherein it is determined if a prepaid customer account has been established for a particular customer. If no account has been established flow proceeds to step 604 wherein an account is established for the customer via known methods. After the account is established or if an account is already established, flow then proceeds to step 606 wherein a request for an adhoc provisioned service/good is received. It is determined at step 608 if funds are available in the customer's prepaid account to pay for the requested service. If it is determined that there are insufficient funds in step 608, flow proceeds to step 610 wherein a warning message is sent to the customer. This determination can be made at the ABMF 306, for example. It is contemplated that the warning message can include a notification of insufficient funds and may optionally provide instructions to replenish their account, such as by using a telephone number or website. Alternatively, the message may be interactive such that the user can replenish their account from their communications device. SMS, MMS, and USSD are some examples of message types that may be used to facilitate this aspect of the present invention although other message types are also contemplated.

At step 612 the customer is provided with the option to replenish their account to allow the request service to be charged and provisioned. If the customer does not elect to replenish their account the method ends. If the customer does elect to replenish their account, then flow proceeds to step 614 wherein an account credit is received and the account balance is accordingly updated. An account credit can be funded by a bank account, savings account, a debit account, a points account, or in some instances a credit account if the prepaid customer has been pre-approved. The customer can call a customer care system and speak with a human operator or an automated system to deposit funds into their account. As an alternative, a web interface may be provided to facilitate such deposits. Funding may also be sourced from a prepaid card.

After the account credit is received in step 614 or funds are available in step 608, flow proceeds to step 616 and the appropriate amount is deducted from the customer's account for the requested service/good. The account balance is also updated. Flow then proceeds to step 618 wherein an authorization is sent to the corresponding service node (i.e., the service node to facilitate the requested service). At step 618 the service node receives the authorization and grants access to the requested service in accordance with the parameters established for the requested service. These parameters can include, for example, the expiration date and expiration quantity for the requested service. More information with regard to the management of provisioning for a service/good is described with reference to FIG. 8. After authorization is received and access is granted the method ends.

Referring now to FIG. 7, a flow diagram illustrating an exemplary method 700 for adhoc provisioning of services and/or goods to a postpaid customer in accordance with the present invention is illustrated. The method 700 begins and flow proceeds to step 702. If an account is not established, flow proceeds to step 704 wherein a postpaid customer account is established. After an account is established at step 704 or if an account is established at the start of the method 700, flow proceeds to step 706 wherein a request for an adhoc provisioned service/good is received. At step 708, the user is prompted for payment type. For example, the customer may choose to have the service charges billed to his postpaid account and receive an invoice with the applicable charges at the end of a billing period, to deduct the charges from a debit account, or make a one-time payment. If the customer elects to receive a bill for the requested service, flow moves to step 710 and an authorization process is performed. The authorization process can include steps to determine the customer's account status such as current or delinquent. If the account is current, the account may be authorized at step 712 and flow would then proceed to step 714. At step 714, an authorization is sent to the corresponding service node. At step 716, the service node receives the authorization and grants access to the requested service in accordance with the associated parameters, and the method ends.

If, however, at step 712 it is determined that the account is delinquent or otherwise unauthorized, a warning message may be sent at step 718. It is contemplated that the warning message can include a warning of the delinquency or other reason for not authorizing the customer's service request. In some embodiments the user may be prompted to pay the current outstanding balance on their account prior to receiving the requested service. As such, after step 718 flow proceeds to step 720 wherein the customer can decide if they would like to pay using a one-time payment via a credit card, debit card, bank draft, e-check, gift card, or other form of payment, or if they would like to use a debit account associated with the postpaid account. In one embodiment, a debit account is established by the postpaid customer as a funds source for adhoc provisioned services and/or goods and is linked to the customer's postpaid account. Functionally, this debit account is similar to the account setup for a prepaid customer. In addition, the debit account may be used to pay monthly reoccurring charges (MRCs) such as those associated with the postpaid customer's subscription plans. If a one-time payment is selected, flow proceeds from step 720 to step 722 and a one-time payment operation is performed, otherwise the charges are debited from the customer's debit account. Regardless of whether payment is received from a debit account or a one-time payment, flow proceeds to step 714 and an authorization is sent to the corresponding service node. At step 716, the service node receives the authorization and grants access to the requested service in accordance with the associated parameters, and the method ends.

Referring now to FIG. 8, a flow diagram of an exemplary method 800 for managing a provisioning database in accordance with the present invention is illustrated. The method 800 begins and flow proceeds to step 802 wherein a database entry is established for a provisioned service or good, such as one provisioned for a prepaid customer in FIG. 6 or a postpaid customer in FIG. 7. At step 804, the parameters for the provisioned service are stored. The parameters can include an expiration date for the service/good and an expiration quantity. An expiration date can be determined by the service provider and can be any period of time defined in terms of seconds, minutes, hours, days, weeks, months, or years. By way of previous example, a data session can be provisioned for use by a customer, upon selection of the service the customer would be notified of the expiration date such as 30 days. Upon payment/billing and authorization of the service a timer can be enabled at step 806. It is contemplated that some services/goods may have expiration dates, but may also have an expiration quantity. Drawing from the previous example, the data session may include an expiration quantity of 120 minutes. Accordingly, in step 806 a usage monitor would also be enabled to monitor the customer's usage of the allotted minutes. In some embodiments there is no expiration date and only an expiration quantity such that the customer can use the minutes at leisure.

Figure 12:
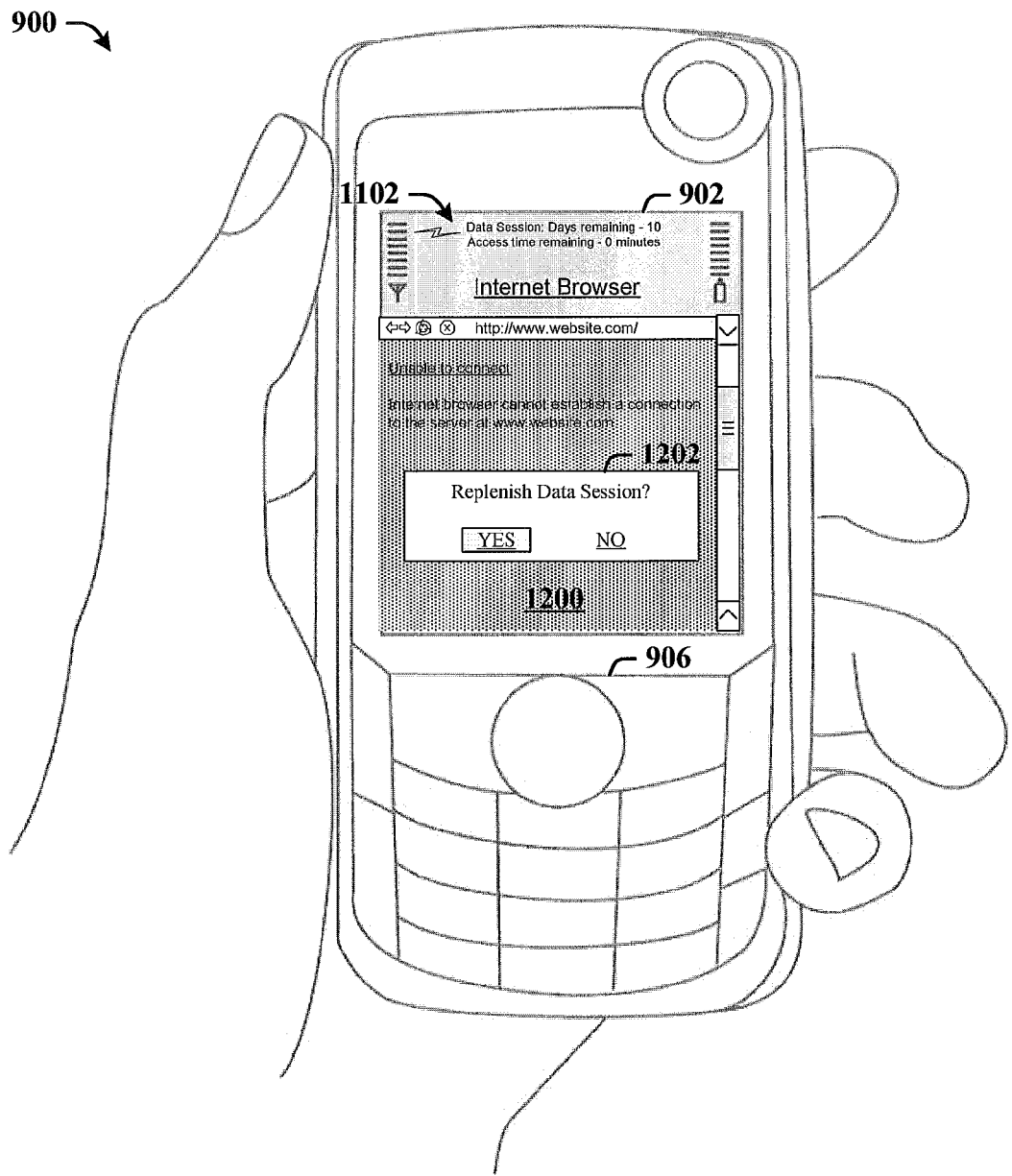
FIG. 12 illustrates an exemplary warning prompt as displayed on a communications device in accordance with the present invention.

Proceeding now to step 808, the timer and usage monitor are updated. This may take place, for example, after the customer ends a data session. Flow then proceeds to step 810 wherein it is determined if the service/good has expired. If the service is expired the method 800 ends, otherwise flow proceeds back to step 808 and the timer and usage monitor are updated until one of the expiration date and expiration quantity is met. The customer may be prompted to replenish the service/good after expiration. An example of this is illustrated in FIG. 12.

Figure 9:
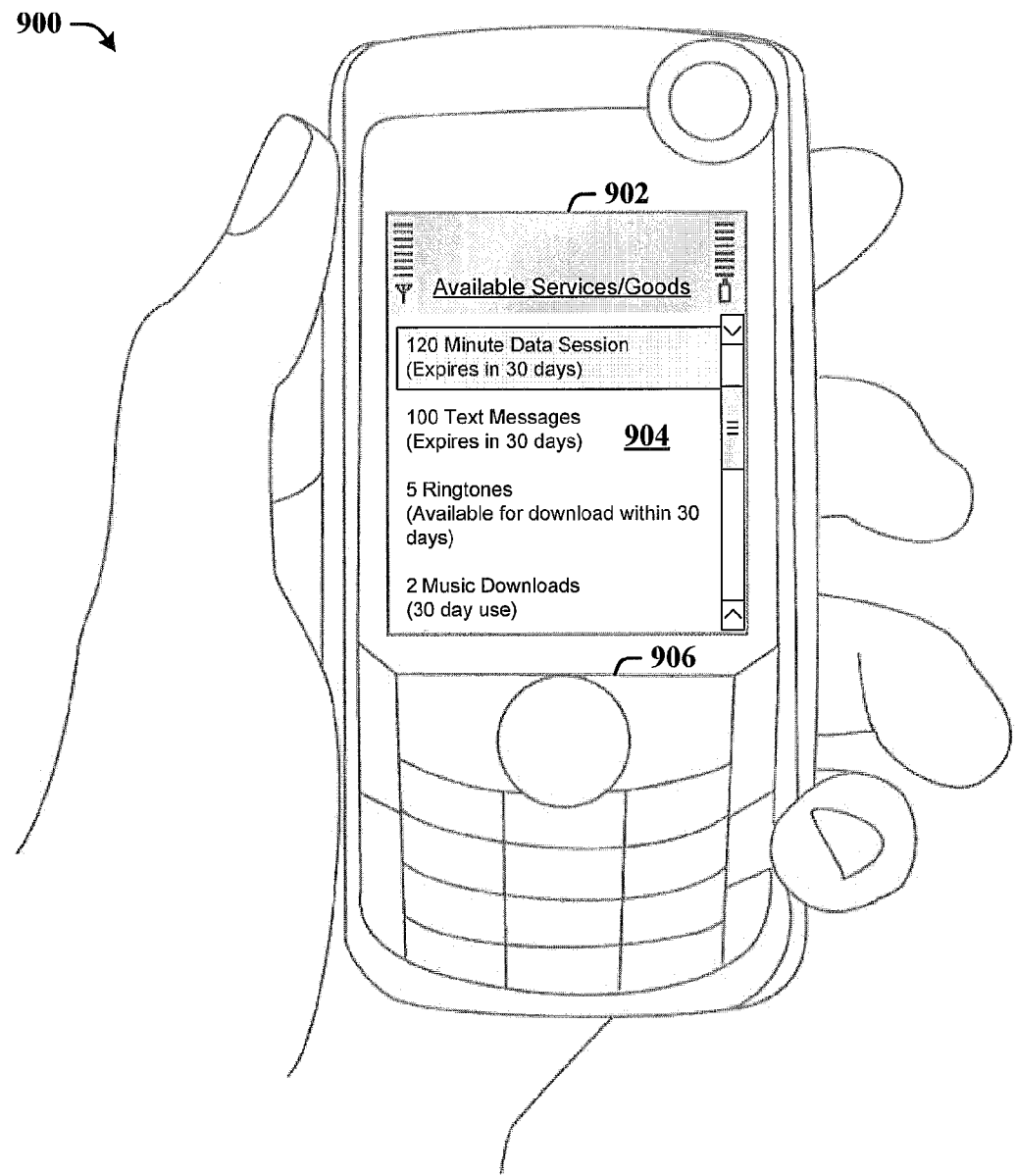
FIG. 9 illustrates an exemplary service/good availability screen as displayed on a communications device in accordance with the present invention.

Referring now to FIG. 9, an exemplary communications device 900 is illustrated. The illustrated communications device 900 includes a display 902, such as a liquid crystal display (LCD), on which an exemplary service/good availability screen 904 is illustrated. As illustrated, a 120 minute data session is highlighted and may be selected by using a hard key from keypad 906, a soft key (not shown) or other selection method such as a scroll wheel, touch screen, or the like. It is contemplated that an International Mobile Equipment Identity (IMEI) or similar identification may be used to determine which services are available for a particular communications device. Accordingly, any unavailable services/goods could be marked as unavailable such as by removing them from the list or otherwise indicating unavailability for those services/goods. Moreover, a customer's International Mobile Subscriber Identity (IMSI) or similar identification may be used by the service provider to limit the services available to that subscriber at the service provider's discretion or as indicated by the owner of the account (e.g., a parent of a child that is using prepaid service).

Figure 10:
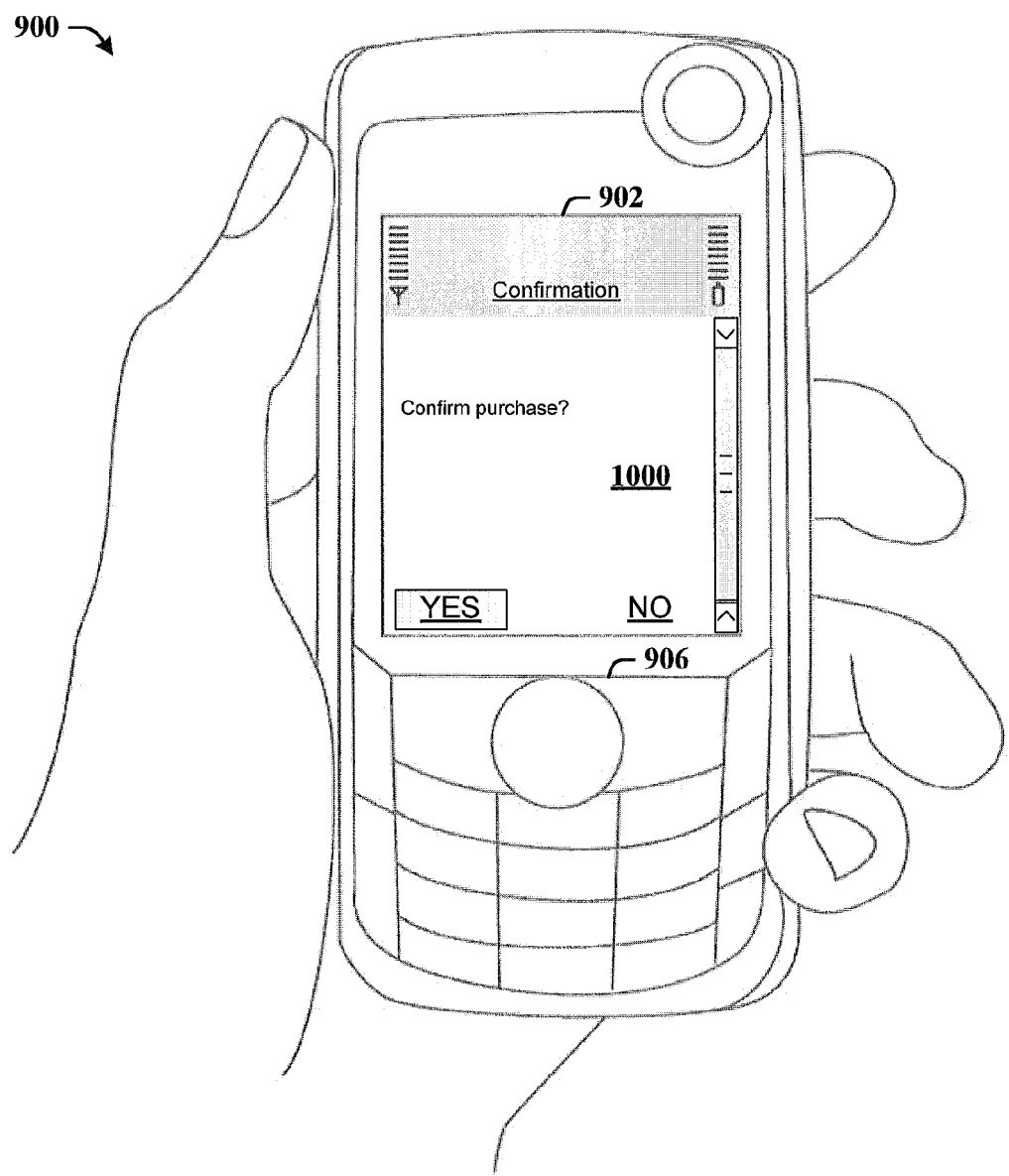
FIG. 10 illustrates an exemplary confirmation screen as displayed on a communications device in accordance with the present invention.

Referring now to FIG. 10, a customer has selected the 120 minute data session for real-time provisioning. A confirmation screen 1000 is illustrated on display 902. The confirmation screen 1000 provides options for the customer to confirm the purchase or cancel the purchase. In the illustrated confirmation screen 1000, the customer has selected to confirm the purchase.

Figure 11:
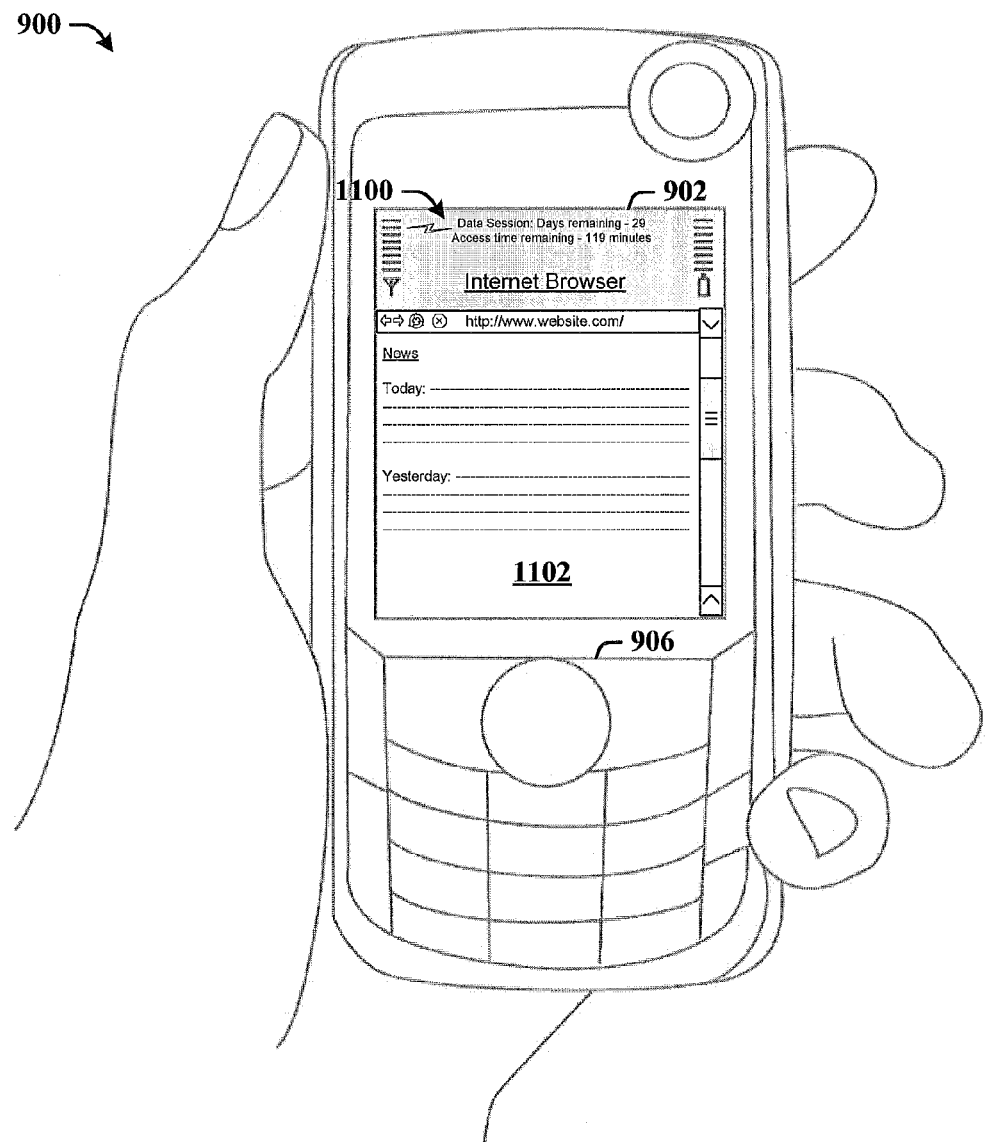
FIG. 11 illustrates an exemplary service indicator as displayed on a communications device in accordance with the present invention.

Referring now to FIG. 11, a customer is utilizing the purchased data access session. The display 902 now shows a service/good indicator 1100 to notify the customer that the session is currently being used and the number of days remaining (29 days) and access time remaining (119 minutes). The service/good indicator 1100 can include any icon, photo, or other image, text, sound, or any combination thereof to notify the user of any pending expiration time or expiration quantity. An Internet browser screen 1102 is also illustrated.

Referring now to FIG. 12, the service/good indicator 1102 has updated to reflect that only 10 days remain for the provisioned service and that 0 minutes of access time remain. The Internet browser screen 1200 has also been updated to illustrate that the data session is no longer available. A prompt 1202 is also shown. The prompt 1202 can be used to further notify the customer of the expired service and provide the option for the customer to replenish the service. If the customer elects to replenish the service, the charging methods previously described in FIGS. 6 and 7 could be used to charge the customer for the service and reprovision the service for a determined expiration time and/or expiration quantity. This could be particularly useful for applications where the provisioned service or good was originally provisioned as a trial, after which the customer may want to continue service.

The law does not require and it is economically prohibitive to and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, for adhoc provisioning of an equipment insurance policy to a postpaid customer using a communications network, comprising:
   receiving, from the postpaid customer, a request for the equipment insurance policy;
   determining that a cost for the equipment insurance policy is to be billed;
   performing payment processing in connection with the equipment insurance policy requested, the payment processing comprising:
      determining whether the customer is authorized for billing in connection with the request for the equipment insurance policy;
      if it is determined that the postpaid customer is not authorized for billing:
         sending a first warning message to the postpaid customer;
         requesting payment from an account;
         determining if funds are available in the account to debit a cost of the equipment insurance policy;
         sending, if funds are not available, a second warning message to the customer;
         deducting, from the account, if funds are available, a payment for the cost of the equipment insurance policy; and
         updating a balance of the account; and
      billing the postpaid customer if it is determined, in connection with the request for the equipment insurance policy, that the postpaid customer is authorized for billing;
   sending, to a network node, in response to the payment being obtained or billed appropriately, an authorization authorizing the network node to put the equipment insurance policy into effect according to a parameter including an expiration date of the policy;
   maintaining the equipment insurance policy in effect during a policy period to end at the expiration date of the policy; and
   storing, in a database, the parameter, associated with the equipment insurance policy put into effect, including the expiration date of the policy.

2. The method of claim 1, wherein the equipment insurance policy relates to wireless equipment.

3. The method of claim 1, wherein the equipment insurance policy relates to wireline equipment.

4. The method of claim 1, wherein the equipment insurance policy relates to digital media equipment.

5. The method of claim 1, wherein the account is one of the following: a checking account, a savings account, a debit account, a credit account, and a points account.

6. The method of claim 1, wherein the payment is received via a customer care system.

7. The method of claim 6, wherein the customer care system comprises an automated system.

8. The method of claim 6, wherein the customer care system comprises a web interface.

9. The method of claim 1, wherein the payment is funded by a prepaid card.

10. The method of claim 1, wherein the first warning message comprises a notification that the postpaid customer is not authorized for billing and payment for the equipment insurance policy will be deducted from the account, and the second warning messages comprises a notification of insufficient funds.

11. The method of claim 1, wherein each one of the first warning message and the second warning message is one of a Short Message System message, a Multimedia Message System message, and an Unstructured Supplementary Service Data message.

12. The method of claim 11, wherein each one of the first warning message and the second warning message is interactive such that the postpaid customer can request replenishment of the account.

13. The method of claim 1, further comprising receiving a request for replenishment of the account.

14. The method of claim 1, wherein the parameter also comprises a quantity of the equipment insurance policy.

15. A method, to provide, using a communications network, a feature to a user, comprising:
   providing a basic rate plan, the basic rate plan having an associated, first, time period and being a postpaid rate plan;
   receiving, from the user, a request for the feature, the request including an identification number represented on a prepaid card so the user can view the number and provide the number as part of the request;

determining whether the request is received from a mobile communication device of the user;

authenticating the request in response to determining that the request was received from the mobile device of the user;

determining, in response to authenticating the request, and using the identification number, to provide the feature requested for an automatically-expiring, second time period corresponding to the feature;

provisioning, in response to determining to provide the feature, the feature for the automatically expiring time period as an add-on feature to the basic rate plan, wherein the automatically expiring time period for the feature is shorter in duration than the first time period for the basic rate plan; and providing, in response to provisioning the feature, access to the feature for the second, automatically expiring time period.

16. The method of claim 15, wherein provisioning the feature for the automatically expiring time period comprises provisioning the feature for the automatically expiring time period in addition to a previously provisioned feature, the previously provisioned feature having been provisioned for a second automatically expiring time period as an add-on feature to the basic rate plan.

17. The method of claim 15, wherein the feature is a wireless service.

18. The method of claim 15, wherein the feature is a wireline service.

19. The method of claim 15, wherein the feature is digital media content.

20. A method, to provide, using a communications network, an add-on feature to a user, comprising:

provisioning a base rate plan for a first time period, the base rate plan being a postpaid rate plan;

receiving, from the user, a request for the add-on feature, the request including an identification number represented on a prepaid card so the user can view the number and provide the number as part of the request;

determining whether the request is received from a mobile communication device of the user;

authenticating the request in response to determining that the request was received from the mobile device of the user;

determining, in response to authenticating the request, and using the identification number, to provide the feature requested for an automatically-expiring, second time period corresponding to the feature;

provisioning, in response to determining to provide the feature, the add-on feature in addition to the base rate plan for the second time period;

providing access to the base rate plan for the first time period; and providing, in response to provisioning the feature, access to the add-on feature for the second time period.

21. The method of claim 20, wherein providing access to the base rate plan for the first time period comprises providing access to the base rate plane for a billing cycle period.

22. The method of claim 20, wherein providing access to the base rate plan for the first time period comprises providing access to the base rate plane for a contract term period.

23. The method of claim 20, wherein providing access to the add-on feature for the second time period comprises providing access to the add-on feature for a shorter time period than the first time period.

24. The method of claim 20, wherein provisioning the base rate plan comprises provisioning a base voice plan.

25. The method of claim 20, wherein provisioning the base rate plan comprises provisioning a data plan.

26. The method of claim 20, wherein the second time period is set to automatically expire.

27. The method of claim 26, wherein the add-on feature terminates when the second time period expires.

28. The method of claim 26, wherein the second time period is renewable.

29. The method of claim 20, wherein provisioning the add-on feature comprises provisioning a wireless service.

30. The method of claim 20, wherein provisioning the add-on feature comprises provisioning a wireline service.

31. The method of claim 20, wherein the add-on feature is digital media content.

32. A method, for adhoc provisioning of a satellite radio service to a postpaid customer using a communications network, comprising:

receiving, from the postpaid customer, a request for the satellite radio service;

determining that a cost for the satellite radio service is to be billed;

performing payment processing in connection with the satellite radio service requested, the payment processing comprising:

determining whether the customer is authorized for billing in connection with the request for the satellite radio service;

if it is determined that the postpaid customer is not authorized for billing:

sending a first warning message to the postpaid customer;

requesting payment from an account;

determining if funds are available in the account to debit a cost of the satellite radio service;

sending, if funds are not available, a second warning message to the customer;

deducting, from the account, if funds are available, a payment for the cost of the satellite radio service; and updating a balance of the account; and if it is determined, in connection with the request for the satellite radio service, that the postpaid customer is authorized for billing, billing the postpaid customer;

sending, to a network node, in response to the payment being obtained or billed appropriately, an authorization authorizing the network node to put the satellite radio service into effect according to a parameter including an expiration date associated with provision of the service to the user;

storing, in a database, the parameter, associated with the satellite radio service put into effect, including the expiration date of the service; and maintaining the satellite radio service in effect during a service period to end at the expiration date of the service.

33. The method of claim 32, wherein the account is one of the following: a checking account, a savings account, a debit account, a credit account, and a points account.

34. The method of claim 32, wherein the payment is received via a customer care system.

35. The method of claim 34, wherein the customer care system comprises an automated system.

36. The method of claim 34, wherein the customer care system comprises a web interface.

37. The method of claim 32, wherein the payment is funded by a prepaid card.

38. The method of claim 32, wherein the first warning message comprises a notification that the postpaid customer is not authorized for billing and payment for the satellite radio service will be deducted from the account, and the second warning messages comprises a notification of insufficient funds.

39. The method of claim 32, wherein each one of the first warning message and the second warning message is one of a Short Message System message, a Multimedia Message System message, and an Unstructured Supplementary Service Data message.

40. The method of claim 39, wherein each one of the first warning message and the second warning message is interactive such that the postpaid customer can request replenishment of the account.

41. The method of claim 32, further comprising receiving a request for replenishment of the account.

42. The method of claim 32, wherein the parameter also comprises a quantity of the satellite radio service.

\* \* \* \* \*